US 6,526,179 B2

United States Patent
Goldstein et al.

(10) Patent No.: US 6,526,179 B2
(45) Date of Patent: *Feb. 25, 2003

(54) COMPRESSION SENSITIVE SHARPENING (75) Inventors: Judith A. Goldstein, Hillsboro, OR (US); Thomas P. O'Rourke, Portland, OR (US); Rajeeb Hazra, Beaverton, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,799

(22) Filed: Apr. 14, 1999

(65) Prior Publication Data

US 2002/0034335 A1 Mar. 21, 2002

(51) Int. Cl.⁷ .................................................. H04N 7/30
(52) U.S. Cl. ....................................... 382/254; 382/263
(58) Field of Search ................................ 382/254–256, 382/260–269

(56) References Cited

U.S. PATENT DOCUMENTS

| 4,782,399 A | 11/1988 | Sato .......................... 358/447 |
| 5,172,227 A | 12/1992 | Tsai et al. .................... 358/133 |
| 5,524,162 A | 6/1996 | Levien ........................ 382/263 |
| 6,021,256 A | 2/2000 | Ng et al. ..................... 382/266 |
| 6,091,511 A | 7/2000 | Ben Dror .................... 382/366 |

FOREIGN PATENT DOCUMENTS

| EP | 0398861 | 11/1990 | ............ H04N/1/40 |
| EP | 0721286 | 7/1996 | ............ H04N/7/30 |
| WO | 97/40627 | 10/1997 | ............ H04N/7/30 |

OTHER PUBLICATIONS

O'Rourke, T.P., et al., "Improved Image Decompression for Reduced Transform Coding Artifacts", *IEEE Transactions of Circuits and Systems for Video Technology*, 5, 490–499, (Dec. 1995).

Reichenbach, S.E., et al., "Two–Parameter Cubic Convolution for Image Reconstruction", *SPIE Visual Communications and Image Processing IV*, 1199, 833–840, (Nov. 8–10, 1989).

*Primary Examiner*—Thomas D. Lee
*Assistant Examiner*—Stephen Brinich
(74) *Attorney, Agent, or Firm*—Schwegman, Lundberg, Woessner & Kluth P.A.

(57) ABSTRACT

A method comprising decoding a video image such that the decoding generates a number of transform coefficients. Additionally, the number of transform coefficients are processed to determine whether to sharpen the video image.

27 Claims, 3 Drawing Sheets

COMPRESSION SENSITIVE SHARPENING

FIELD

The present invention relates to image processing and, in particular, to adaptive sharpening of an image.

BACKGROUND

Applications that use and display compressed video often must prepare video for transmission over a communications pipeline such as ordinary phone lines (i.e., Plain Old Telephone Service) (POTS)) or Integrated Services Digital Network (ISDN), which provide a limited bandwidth through which the video must be transmitted. This limitation on the bandwidth imposes a qualitative upper bound on the video compressed with state of the art algorithms. Additionally, when the communication is over POTS, the size of the frames are typically limited. In general, the compressing of data is a lossy process and a consequence thereof is the manifestation of compression artifacts which are products introduced into the image as a result of compression that do not exist otherwise. Moreover, data compression subjects the image to a general loss of detail. Despite these limitations, application users, typically, want bigger video images (i.e., images occupying a significantly greater percentage of the display screen area).

When images are small, the eye is forgiving. However when scaling images to larger sizes, the small defects (e.g., the artifacts or loss of detail and texture) due to the compression become extremely visible causing the image to frequently appear "washed out" as the same information is spread over a larger area. To avoid this "washed out" effect, sharpening post filters are applied to help bring some more definition and crispness to images. However, compression artifacts, such as ringing, must be taken into account during the sharpening process. Otherwise, these defects are magnified along with the image causing the image to look even worse than if no sharpening was performed. Therefore, for these and other reasons there is a need to identify the undesirable compression artifacts within an image and obviate their amplification during the sharpening process through adaptive sharpening of an image which sharpens all of the image excluding the identified undesirable compression artifacts.

SUMMARY

In one embodiment, a method includes decoding a video image such that the decoding generates a number of transform coefficients. Additionally, the number of transform coefficients are processed to determine whether to sharpen the video image.

DETAILED DESCRIPTION

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

In the following detailed description of the exemplary embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
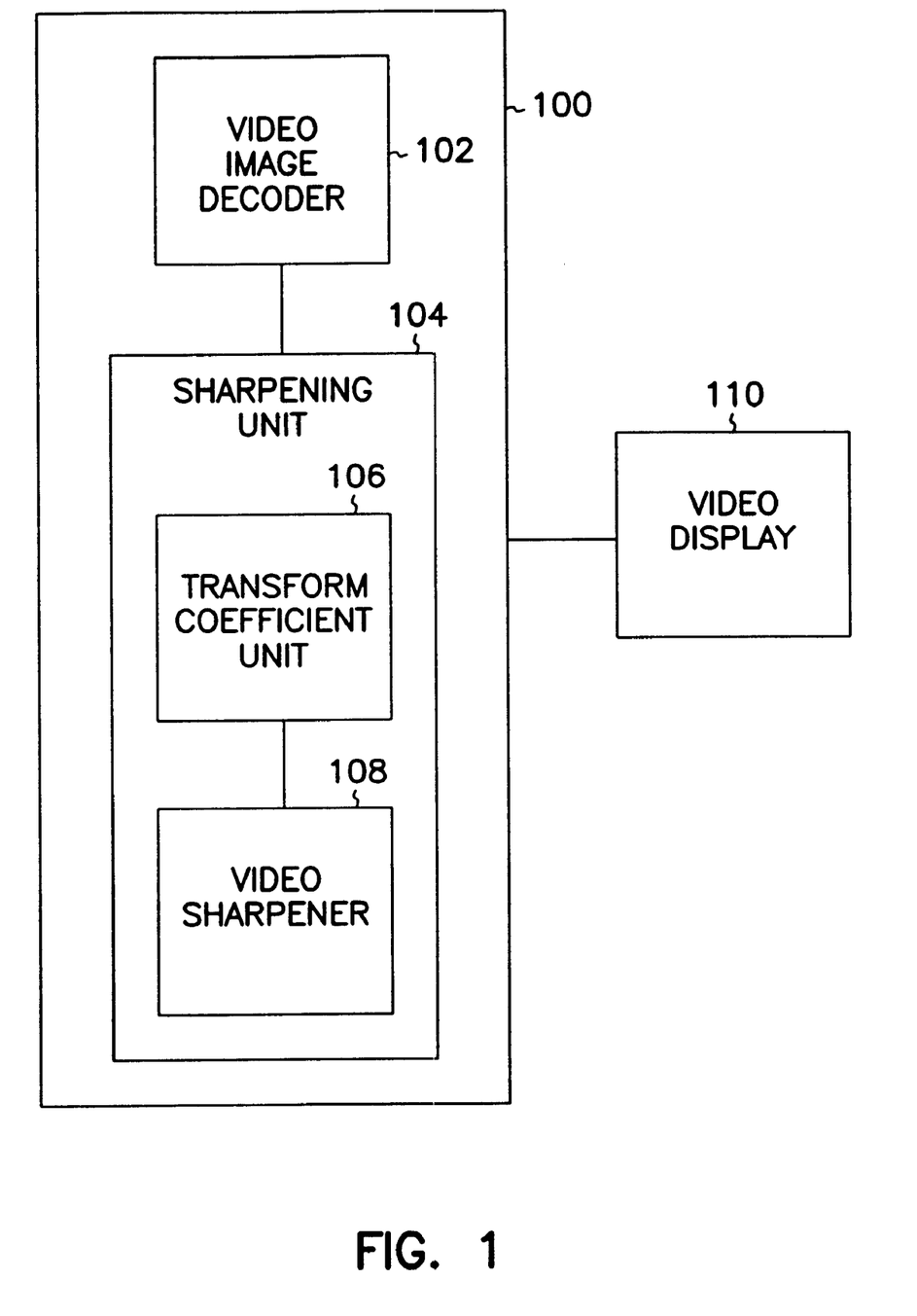
FIG. 1 is a block diagram of a system in accordance with an embodiment of the invention.

Referring first to FIG. 1, a block diagram of a system according to one embodiment of the invention is shown. The system of FIG. 1 includes computer 100, video image decoder 102, sharpening unit 104, transform coefficient unit 106, video sharpener 108, and video display 110. As shown, video image decoder 102, sharpening unit 104, transform coefficient unit 106 and video sharpener 108 are desirably a part of computer 100, although the invention is not so limited. In such an embodiment, video image decoder 102, sharpening unit 104, transform coefficient unit 106 and video sharpener 108 are desirably computer programs on a computer—i.e., programs (viz., a video image decoder program, a sharpening unit program, a transform coefficient unit program and a video sharpener program) executed by a processor of the computer from a computer-readable medium such as a memory thereof. Those of ordinary skill within the art will appreciate that computer 100 may also include other components, not shown in FIG. 1; only those parts necessary to describe the invention in an enabling manner are provided.

Video image decoder 102 decodes a compressed video sequence using a block-based transform that is well-known in the art. Standards for video compression include H.261, H.263, MPEG (Motion Picture Experts Group)-1, MPEG-2 and JPEG (Joint Photographic Experts Group). ITU-T (Telecommunications Standardization Sector of International Telecommunication Union, previously known as CCITT(The International Telegraph and Telephone Consultative Committee)) H.261, *Video Codec for Audiovisual Services at px64 kbits;* ITU-T H.263, *Video Coding for Low Bit rate Communication;* ISO/IEC (International Organization for Standardization/Internal Electrotechnical Commission) 11172-2 (MPEG-1 Video), *Information Technology—Coding of Moving Pictures and Associated Audio Information for Digital Storage Media at up to about 1.5 Mbit/s. Part 2 Video;* ISO/IEC 13818-2 (MPEG-2 Video), *Information Technology—Generic Coding of Moving Pictures and Associated Audio Information: Part 2 Video,* ISO 10918-1 (CCITT T. 81) JPEG, *Information Technology—Digital Compression and Coding of Continuous-Tone Still Images— Requirements and Guidelines;* ISO/IEC 14496-2: 1999 (MPEG-4 Video) *Information Technology—Generic Coding of Audio-Visual Objects— Part 2: Visual.*

One intermediate result of this decode (i.e. decompress) by video image decoder 102 is a number of transform coefficients for each of the blocks in the video image. In one embodiment, these number of transform coefficients are Discrete Cosine Transform (DCT) coefficients (i.e., the transform is the Discrete Cosine Transform), as is well-known in the art. The encoding process uses this transform to transform the two-dimensional block of pixels (i.e., the video image) from the spatial domain to the transform domain creating a two-dimensional array of transform coefficients. In turn, the decoder uses these transform coefficients to recreate the video image that the encoder compressed. Besides using these coefficients to decode the video image, in embodiments, discussed below, these transform coefficients are used to determine whether to sharpen portions of the image.

For each of the blocks within the decoded video image, sharpening unit 104 receives the number of transform coefficients and processes the number of transform coefficients to determine whether to sharpen the video image. In one embodiment, sharpening unit 104 includes transform coefficient counter 106 that is capable of receiving each block of the video image and generating a transform count value for each block based on a number of non-zero transform coefficients for each block. In another embodiment, transform coefficient counter 106 comprises a locating unit which traverses each block of the video image in a certain order and locates the last non-zero transform coefficient in the order. When a video image is compressed and sent through a transmission system (e.g., POTS, ISDN or the Internet), the video image is represented as a stream of bits. The video decoder interprets the stream of bits to determine the position and value of the transform coefficients associated with the compressed video image. In one embodiment, transform coefficient counter 106 comprises a bitstream unit to interpret the stream of bits to determine the position of the non-zero transform coefficients. In another embodiment, transform coefficient counter 106 comprises a mechanism to determine the position of the non-zero transform coefficient from the decoded stream of bits.

In one embodiment, the locating unit sets the transform count value to the position of the non-zero transform coefficient. In an alternative embodiment, the locating unit takes the position of this last non-zero transform coefficient and adds a number to form the transform count value. In one embodiment, this number being added to the position of the last non-zero transform coefficient is one.

In another embodiment, the order of traversal is a zigzag order. The zigzag order, as is well-known in the art, is defined in the above cited specifications for H.261, MPEG-1, MPEG-2 and MPEG-4. During the encoding process various orders of traversal of the blocks of the video image are used in transforming a block from the spatial to the transform domain during the transform. To take maximum advantage of this, the transform coefficients are organized in a zigzag order to produce long runs of zeroes. The decoding process uses the same order of traversal for decoding and is also used to determine the position of non-zero transform coefficients for each block of the video image. It should be appreciated that the order of traversal employed by the present invention is not critical to the overall operation of the system and the advantages obtained therefrom could be obtained with other orders of traversal.

Additionally, the sharpening unit 104 is comprised of video sharpener 108. Video sharpener 108 receives the transform count value for each block and sharpens the blocks whose transform count value is less than a predetermined threshold. In contrast, if the transform count value is not less than the predetermined threshold, this block is not sharpened.

In one embodiment for POTS rate video (which is approximately 20 kilo-bits/second (kbits/sec) or less), this predetermined threshold value to which the transform count value is being compared is one. In another embodiment for ISDN rate video (which is approximately 90 kbits/sec or less), this predetermined threshold value to which the transform count value is being compared is five. This predetermined threshold value, however, varies in accordance with the environment in which it is being used, and it not limited to any particular value. For example, video conferencing between two individuals may require a different threshold value than a video sequence involving more details.

In one embodiment, video sharpener 108 comprises a convolution unit to perform a convolution using a piecewise cubic sharpening filter on each block within the video image, as is well-known in the art. In particular, the sharpening filter is essentially a four-tap filter from a third order equation. Ignoring edges, the basic cubic interpolant is:

$$r(x) = \begin{cases} (2+\alpha-6\beta)|x|^3 + (-3-\alpha+9\beta)|x|^2 + (1-2\beta) & \text{if } |x| \le 1 \\ (\alpha+2\beta)|x|^3 + (-5\alpha-9\beta)|x|^2 + (8\alpha+12\beta)|x| + (-4\alpha-4\beta) & \text{if } 1 < |x| \le 2 \\ 0 & \text{otherwise} \end{cases} \quad (I)$$

where α (alpha) is the slope or first derivative when x=1, and β (beta) is the value at x=1. For more information concerning this convolution see Stephen E. Reichenback and Stephen K. Park. Two-Parameter Cubic Convolution for Image Reconstruction. *SPIE Vol.* 1199 *Visual Communications and Image Processing IV,* pages 833–840, 1989. Advantageously, this two-parameter cubic convolution provides for both the zooming and sharpening of a particular block within the video image. The setting of the values of these two parameters (alpha and beta) determine the amount of sharpening to be performed.

In one embodiment, beta remains constant and the amount of sharpening is dependent on the value of alpha. Upon determining the transform count value exceeds the predetermined threshold, a nonsharpening alpha unit applies the default values of −½ and 0 to the alpha and beta parameters respectively, which precludes sharpening of the block within the image. Conversely, upon determining that this predetermined threshold has not been exceeded, a sharpening alpha unit applies a value of 0 to the beta parameter and decreases the value of the alpha parameter (from its default value of −½) to provide a sharpening of the block. In general, as the value of alpha decreases (i.e., becomes more negative), the amount of sharpening increases. In one embodiment using ISDN rate video, the sharpening parameters, alpha and beta, are set to −1.5 and zero, respectively. In another embodiment using POTS rate video, the sharpening parameters, alpha and beta, are set to −1.0 and zero, respectively.

Moreover, it should be appreciated by those skilled in the art that the present invention is not limited to any particular type of video sharpener. Other embodiments of a video sharpener for adaptive sharpening include parametric bilinear convolution or any other filtering providing the zooming of an image and a parametric means to control the smoothing and sharpening for the image.

Video display 110 displays the video image. In another embodiment, the system of FIG. 1 includes a video image scaler to enlarge the size of the video image. In one embodiment, the video image scaler enlarges the image subsequent to video sharpener 110 sharpening the blocks whose transform count value is less than a predetermined threshold but prior to video display 110 displaying the video image.

Figure 2:
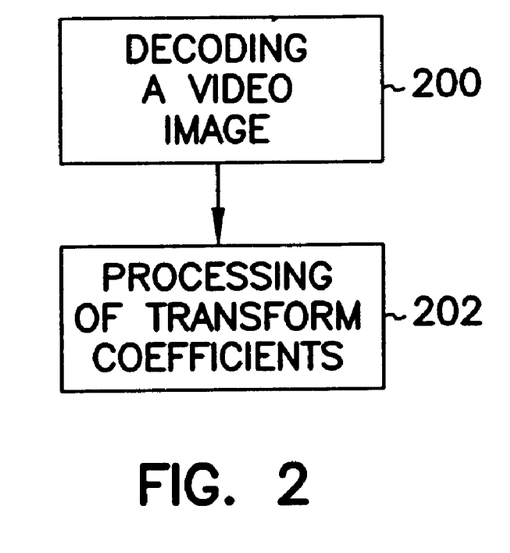
FIGS. 2 and 3 are flowcharts of methods in accordance with embodiments of the present invention.
Figure 3:
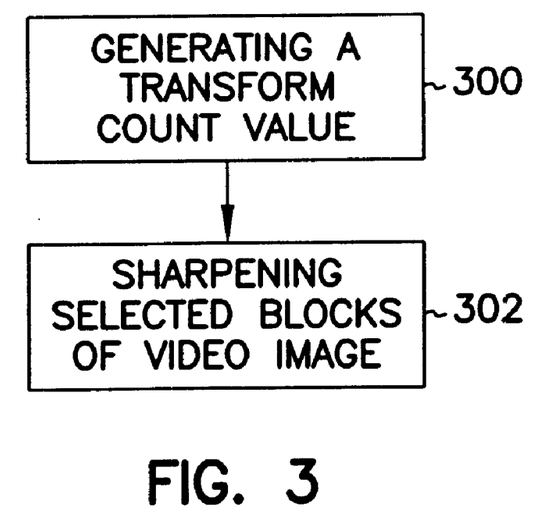

Referring next to FIGS. 2–3, flowcharts of methods in accordance with embodiments of the invention is shown. The methods are desirably realized at least in part as one or more programs running on a computer–that is, as a program executed from a computer-readable medium such as a memory by a processor of a computer. The programs are desirably storable on a computer-readable medium such as a floppy disk, a Compact Disk-Read Only Memory (CD-ROM), for distribution and installation and execution on another (suitably equipped) computer. Additionally, the programs can be stored on a server and be distributed across a network.

Referring first to FIG. 2, in block 200, the video image is decoded into a number of blocks using techniques well-known in the art. Standards for video compression include H.261, H.263, MPEG (Motion Picture Experts Group)-1, MPEG-2 and JPEG (Joint Photographic Experts Group). As previously described, the intermediate result of this decode (i.e. decompress) is a number of transform coefficients for each of the blocks in the video image. In one embodiment, these number of transform coefficients are Discrete Cosine Transform (DCT) coefficients (i.e., the transform is the Discrete Cosine Transform), as is well-known in the art. In block 202, the number of transform coefficients are processed to determine whether to sharpen the video image.

Referring next to FIG. 3, this flowchart illustrates embodiments of the processing of the number of transform coefficients from block 202. In particular, in block 300, a transform count value is generated based on a number of non-zero transform coefficients from among the number of transform coefficients for each block of the video image. In one embodiment, each block of the video image is traversed in a certain order to locate the last non-zero transform coefficient in the order. In one embodiment, the transform count value equals the position of the non-zero transform coefficient. In an alternative embodiment, a number is added to the position of this last non-zero transform coefficient to form the transform count value. In one embodiment, this number being added to the position of the last non-zero transform coefficient is one.

As previously described, when a video image is compressed and sent through a transmission system (e.g., POTS, ISDN or the Internet), the video image is represented as a stream of bits. The video decoder interprets the stream of bits to determine the position and value of the transform coefficients associated with the compressed video image. In one embodiment, the determining of the position of the non-zero transform coefficients in block 202 includes interpreting the stream of bits. In another embodiment, the determining of the position of the non-zero transform coefficients in block 202 includes processing the decoded stream of bits.

In another embodiment, the order of traversal is a zigzag order. The zigzag order, as is well-known in the art, is defined in the above cited specifications for H.261, MPEG-1 and MPEG-2. It should be appreciated that the order of traversal employed by the present invention is not critical to the overall operation of the system and the advantages obtained therefrom could be obtained with other orders of traversal. In block 302, each block of the video image having a transform count value that is less than a predetermined threshold is sharpened.

In one embodiment, the sharpening in block 302 is provided by performing two-parameter cubic convolution on each block within the video image, as is well-known in the art. As previously described, this two-parameter cubic convolution provides for both the zooming and sharpening of a particular block within the video image. Using the above formula for the two-parameter cubic convolution, the setting of the values of these two parameters (alpha and beta) determine the amount of sharpening to be performed.

In one embodiment, beta remains constant and the amount of sharpening is dependent on the value of alpha. Upon determining the number of DCT coefficients exceeds the predetermined threshold, alpha and beta are respectively set to the default values of −½ and 0, which precludes sharpening of the block within the image. Conversely, upon determining this predetermined threshold has not been exceeded, beta remains at 0 and alpha is decreased (beyond its default value of −½) to provide a sharpening of the block. In general, as the value of alpha decreases (i.e., becomes more negative), the amount of sharpening increases. In one embodiment using ISDN rate video, the sharpening parameters, alpha and beta, are set to −1.5 and zero, respectively. In another embodiment using POTS rate video, the sharpening parameters, alpha and beta, are set to −1.0 and zero, respectively.

It should be appreciated by those skilled in the art that the present invention is not limited to any particular type of adaptive sharpening. Other embodiments for adaptive sharpening of block 302 include parametric bilinear convolution or any other filtering providing the zooming of an image and a parametric means to control the smoothing and sharpening for the image.

In another embodiment, the method of FIG. 3 also includes enlarging the size of the video image. In one embodiment, the enlarging of the image occurs subsequent to processing the transform coefficients in block 202. In another embodiment, the video image being decoded in block 200 includes a still image (e.g., a Joint Photographic Experts Group (JPEG) image) or a video frame within a video sequence (e.g., MPEG). ISO 10918-1 (CCITT T.81) JPEG, *Information Technology—Digital Compression and Coding of Continuous-Tone Still Images— Requirements and Guidelines.*

In another embodiment, the amount of sharpening is dynamically adjusted depending on the application and/or the user. In one embodiment, the user is provided a sliding unit (e.g., a slider on the computer screen) to adjust (e.g., increase and decrease) the level of sharpening performed on the blocks of the video image.

Figure 4:
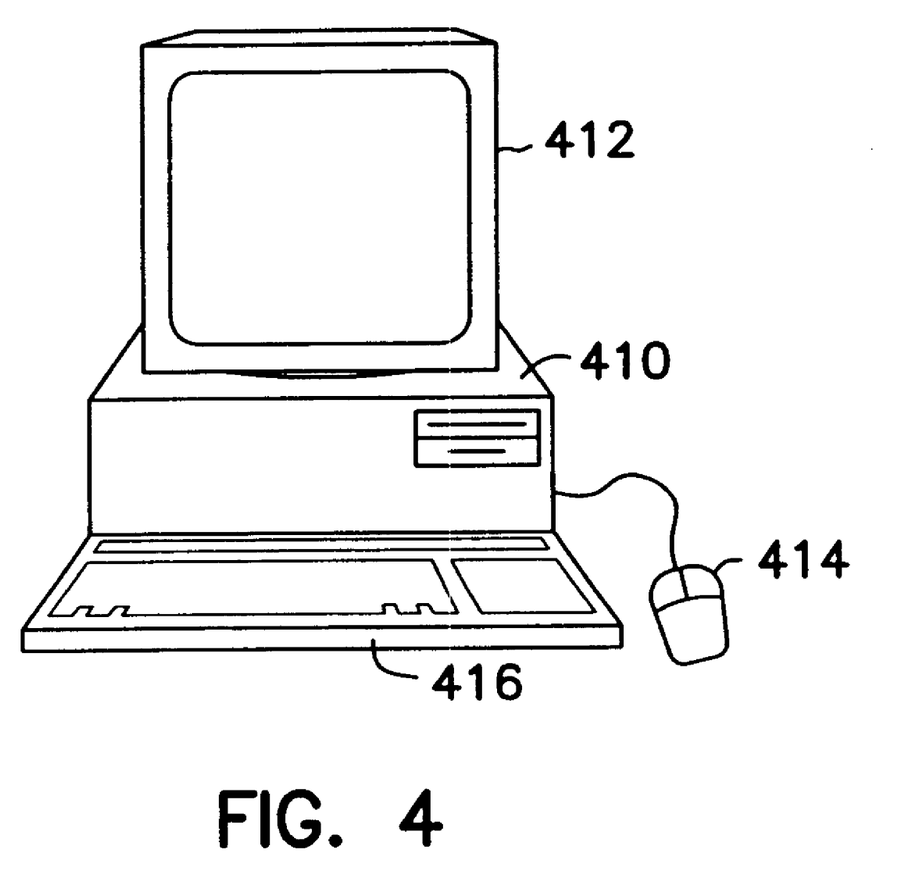
FIG. 4 is a diagram of a computer in conjunction with which embodiment of the invention may be practiced.

Referring finally to FIG. 4, a diagram of a representative computer in conjunction with which embodiments of the invention may be practiced is shown. It is noted that embodiments of the invention may be practiced on other electronic devices including but not limited to a set-top box connected to the Internet. Computer 410 is operatively coupled to monitor 412 and pointing device 414. Computer 410 includes a processor (desirably, one of a number of Intel® Pentium® processors), random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 410. In one embodiment, computer 410 is a PC-compatible computer, running a version of the Microsoft® Windows® operating system. Residing on computer 410 is a computer readable medium storing a computer program which is executed on computer 410. Compression sensitive sharpening performed by the computer program is in accordance with an embodiment of the invention.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is manifestly intended that this invention be limited only by the following claims and equivalents thereof.

What is claimed is:

1. A method comprising:
    decoding a video image having a size and a number of blocks, wherein the decoding of the video image generates a number of transform coefficients; and
    processing a count of the number of transform coefficients to determine whether to sharpen the video image.

2. The method of claim 1, wherein processing the number of transform coefficients comprises:
    generating a transform count value for each block based on a number of non-zero transform coefficients from among the number of transform coefficients for each block; and
    sharpening each block having a transform count value less than a predetermined threshold.

3. The method of claim 2, wherein generating the transform count value for each block comprises deriving the number of non-zero transform coefficients from a decoded bitstream.

4. The method of claim 2, wherein generating the transform count value for each block comprises:
    traversing each block in an order;
    locating a position of a last non-zero transform coefficient in the order; and
    adding one to the position of the last non-zero transform coefficient to form the transform count value.

5. The method of claim 4, wherein the order of traversing each block comprises a zigzag order.

6. The method of claim 2, wherein sharpening each block having the transform count value less than the predetermined threshold comprises performing two-parameter cubic convolution on each block.

7. The method of claim 6, wherein performing two-parameter cubic convolution on each block comprises:
    applying a nonsharpening alpha value to each block having the transform count value greater than or equal to the predetermined threshold; and
    applying a sharpening alpha value to each block having the transform count value less than the predetermined threshold.

8. The method of claim 1, wherein the number of transform coefficients are discrete cosine transform (DCT) coefficients.

9. The method of claim 1, further comprising enlarging the size of the video image.

10. The method of claim 1, wherein the video image is an image selected from a group consisting of a still image and a video frame within a video sequence.

11. A system comprising:
    a computer to adaptively sharpen a video image having a size comprising:
        a video image decoder capable of receiving the video image and decoding the video image into a number of blocks, wherein the video image decoder generates a number of transform coefficients; and
        a sharpening unit capable of receiving the number of transform coefficients and processing a count of the number of transform coefficients to determine whether to sharpen the video image; and
    a video display to display the sharpened video image.

12. The system of claim 11, wherein the sharpening unit comprises:
    a transform coefficient counter capable of receiving each block of the video image and generating a transform count value for each block based on a number of non-zero transform coefficients from among the number of transform coefficients for each block; and
    a video sharpener capable of receiving the transform count value for each block and sharpening blocks having the transform count value less than a predetermined threshold to generate a sharpened video image.

13. The system of claim 12, wherein the transform coefficient counter comprises a bitstream unit capable of deriving the number of non-zero transform coefficients from a decoded bitstream.

14. The system of claim 12, wherein the transform coefficient counter comprises a locating unit capable of receiving each block of the video image, traversing each block in an order, locating a position of a last non-zero transform coefficient in the order for each block and adding one to the position of the last non-zero transform coefficient for each block to output the transform count value for each block.

15. The system of claim 14, wherein the order for traversing each block comprises a zigzag order.

16. The system of claim 12, wherein the video sharpener comprises a convolution unit capable of receiving each block of the video image and performing two-parameter cubic convolution on each block of the video image.

17. The system of claim 16, wherein the convolution unit comprises:
    a nonsharpening alpha unit capable of receiving each block having the transform count value greater than or equal to the predetermined threshold and applying a nonsharpening alpha value to each block having the transform count value greater than or equal to the predetermined threshold; and
    a sharpening alpha unit capable of receiving each block having the transform count value less than the predetermined threshold and applying a sharpening alpha value to each block having the transform count value less than the predetermined threshold.

18. The system of claim 11, wherein the number of transform coefficients are discrete cosine transform (DCT) coefficients.

19. The system of claim 11, further comprising a video image scaler capable of receiving the sharpened video image and enlarging the size of the sharpened video image.

20. The system of claim 11, further comprising a sliding unit capable of adjusting a level of sharpening.

21. The system of claim 11, wherein the video image is an image selected from a group consisting of a still image and a video frame within a video sequence.

22. An article comprising a computer readable medium having a computer program stored thereon for execution on a computer with instructions comprising:

decoding a video image having a size and a number of blocks, wherein the decoding of the video image generates a number of transform coefficients; and processing a count of the number of transform coefficients to determine whether to sharpen the video image.

23. The article of claim 22, wherein processing the number of transform coefficients comprises:

generating a transform count value for each block based on a number of non-zero transform coefficients from among the number of transform coefficients for each block; and sharpening each block having a transform count value less than a predetermined threshold.

24. The article of claim 23, wherein generating the transform count value for each block based on the number of non-zero transform coefficients for each block comprises deriving the number of non-zero transform coefficients from a decoded bitstream.

25. The article of claim 23, wherein generating the transform count value for each block comprises:

traversing each block in an order;

locating a position of a last non-zero transform coefficient in the order; and adding one to the position of the last non-zero transform coefficient to form the transform count value.

26. The article of claim 23, wherein sharpening each block of the video image having the transform count value less than the predetermined threshold comprises performing two-parameter cubic convolution on each block.

27. The article of claim 26, wherein performing two-parameter cubic convolution on each block comprises:

applying a nonsharpening alpha value to each block having the transform count value greater than or equal to the predetermined threshold; and applying a sharpening alpha value to each block having the transform count value less than the predetermined threshold.

* * * * *

UNITED STATES PATENT AND TRADEMARK OFFICE
CERTIFICATE OF CORRECTION

PATENT NO. : 6,526,179 B2
DATED : February 25, 2003
INVENTOR(S) : Rajeeb Hazra, Judith A. Goldstein and Thomas P. O'Rourke It is certified that error appears in the above-identified patent and that said Letters Patent is hereby corrected as shown below:

Title page,
Item [56], References Cited, U.S. PATENT DOCUMENTS, delete "382/366" and insert -- 382/266 -- therefor.
Delete "*of*" before "*Circuits*" and insert -- *On* -- therefor.
Item [74], *Attorney, Agent, or Firm*, insert -- , -- after "Kluth".

Column 1,
Line 13, delete ")" after "Service".

Column 3,
Line 10, delete "Mbit/s." and insert -- Mbit/s: -- therefor.

Column 4,
Line 30, delete "it" after "and" and insert -- is -- therefor.

Column 7,
Line 36, claim 1, insert -- , wherein the processing includes generating a transform count value based on a count criteria from among the number of transform coefficients -- after "image".

Column 8,
Line 22, claim 11, insert -- , the sharpening unit having a transform coefficient counter capable of generating a transform count value based on a count criteria from among the number of transform coefficients -- after "image".

UNITED STATES PATENT AND TRADEMARK OFFICE
CERTIFICATE OF CORRECTION

PATENT NO.    : 6,526,179 B2
DATED         : February 25, 2003
INVENTOR(S)   : Rajeeb Hazra, Judith A. Goldstein and Thomas P. O'Rourke It is certified that error appears in the above-identified patent and that said Letters Patent is hereby corrected as shown below:

Column 9,
Line 16, claim 22, insert -- , wherein the processing includes generating a transform count value based on a count criteria from among the number of transform coefficients -- after "image".

Signed and Sealed this

Twenty-third Day of September, 2003

JAMES E. ROGAN
*Director of the United States Patent and Trademark Office*